United States Patent
Zajkowski

Patent Number: 6,100,605
Date of Patent: Aug. 8, 2000

[54] NEUTRAL BONDING SYSTEM FOR UNINTERUPTIBLE POWER SUPPLY

[75] Inventor: Richard J. Zajkowski, Powell, Ohio

[73] Assignee: Liebert Corporation, Columbus, Ohio

[21] Appl. No.: 09/179,712

[22] Filed: Oct. 27, 1998

[51] Int. Cl.[7] ............................... H02J 7/00; H02H 3/00
[52] U.S. Cl. ............................................. 307/66; 361/75
[58] Field of Search ........................................ 307/112, 113,
307/116, 141, 66; 361/42, 75, 189, 190,
191, 195, 196; 323/258, 344; 363/34, 56, 98

[56] References Cited

U.S. PATENT DOCUMENTS

| | | | |
|---|---|---|---|
| 3,809,963 | 5/1974 | Hutchinson | 317/22 |
| 4,782,241 | 11/1988 | Baker et al. | 307/66 |
| 5,055,703 | 10/1991 | Schornack | 307/66 |
| 5,834,858 | 11/1998 | Crosman, III et al. | 307/66 |
| 6,023,400 | 2/2000 | Nevo | 361/42 |

Primary Examiner—Jeffrey Gaffin
Assistant Examiner—Rios Roberto
Attorney, Agent, or Firm—Mueller and Smith, LPA

[57] ABSTRACT

A UPS device of universal application provides a pair of backfeed relays, which are mandated by certain countries outside the United States, controlled by an overall control circuit to perform in conjunction with the connection of neutral to system ground to avoid damage to a load, UPS and power utility. The control circuit is responsive to an anomaly in the power supply of a power utility to enter a backup mode wherein power is supplied by a battery power supply through an inverter to the load. Entry into backup mode occurs with a delay-based switching logic which governs the control circuit's operation of the backfeed relays and formation of the neutral to system ground connection.

23 Claims, 6 Drawing Sheets

| STATE | UPS MODE | BACKFEED CIRCUIT | NEUTRAL BONDING CIRCUIT | DELAY1 | DELAY2 | DELAY3 | DELAY4 |
|---|---|---|---|---|---|---|---|
| STEADY STATE | STANDBY | ON | OFF | X | X | X | X |
| STEADY STATE | BACKUP | OFF | ON | X | X | X | X |
| TRANSITION | MAINS-BATTERY | TURN OFF (FAST) | TURN ON (SLOW) | X | 0ms | 10ms | X |
| TRANSITION | BATTERY-MAINS | TURN ON (SLOW) | TURN OFF (FAST) | 10ms | X | X | 0ms |

FIG. 11

NEUTRAL BONDING SYSTEM FOR UNINTERUPTIBLE POWER SUPPLY

CROSS-REFERENCE TO RELATED APPLICATIONS

STATEMENT REGARDING FEDERALLY SPONSORED RESEARCH

Not applicable.

BACKGROUND OF THE INVENTION

The rise in complexity and sophistication of electronically controlled devices and systems has been observed to generate a concomitant need for higher quality and very stable sources of power. This need particularly has been witnessed in connection with computer systems, including modems, printers and copiers.

Directly supplied utility power alone is found to be unacceptable for such equipment as a consequence of line power anomalies now typically encountered. These anomalies are manifested as any of a variety of phenomena. For example, out of specification voltages, referred to as "sags," are represented as a reduction in rms voltage values over a half cycle interval or more. Where such voltage reductions persist within important grids, they are conventionally referred to as "brown outs."

In addition to "sags" as above described, over-voltage excursions referred to as "surges" may be encountered which, in general, are manifested as deviations above nominal rms value lasting for more than half a cycle. These surges generally are encountered in conjunction with load dropping activities.

Subcycle abnormalities also are witnessed in the line power supplies. For example, high voltage, short-term spikes may occur. Such excursions have been observed to be caused, inter alia, by lightening strikes or sub-station or capacitor switching by a utility.

Static noise conditions also may be encountered in the line power supplies. Such noise phenomena will include common mode noise occasioned by the operation of electrical equipment in close proximity to the source being relied upon or through load switching. Further, transverse mode noise also may be encountered appearing line-to-line and having similar causation.

When encountered within a computer environment, the above cataloged anomalies in line power will have a variety of effects. Line noise may result in data error, unprogrammed jumps and software/data file alterations. Momentary under- and over-voltage generally results in automatic computer power down.

Efforts to overcome the anomalies of line power supplies have evolved a variety of power conditioning devices. One such device is the uninterruptible power supply (UPS). A UPS system consists of a battery power supply, an inverter, a number of switches and a control circuit. A number of different types of UPS systems have been devised including on-line, off-line and interactive UPS systems.

The input to a single phase UPS system consists of three conductors, line, neutral and safety ground, which connect to the corresponding three lines of a power utility. The output of a UPS system consists of line, neutral and safety ground conductors which are connected to the load. A control circuit monitors the three line power supply sensing any anomalies in voltage supplied by the utility during the time when the UPS system is in standby mode. In the event of such an anomaly, the control circuit derives a control input which opens the switches which connect the UPS system to the line power supply of the power utility. The UPS system then is disconnected from the line power supply, and the UPS system operates in a backup mode. In backup mode, power then is delivered from the battery power supply through an inverter to the load. Backfeed protection switches are opened and the battery power supply is engaged in such a way as to provide a continuous supply of power to the load.

Because of the widespread growth of technology and increasing globalization, the market for UPS systems is worldwide. In designing UPS systems, manufacturers must be aware of and comply with the regulations regarding such systems in each of the countries in which it plans to market a system. Approximately eighteen countries in Europe have joined together to form the European Committee for Electrotechnical Standardization (CENELEC). Subject to certain conditions, each European Standard promulgated by the CENELEC must be given the status of a national standard without any alteration. A European Standard may be amended by the CENELEC and each exists in the three official versions, English, French and German. Participating countries include Austria, France, Germany, Italy, Spain and the United Kingdom among others.

While the United States is not a member of the CENELEC and thus not subject to its regulations, manufacturers in this country typically comply with the regulations promulgated by the Underwriter's Laboratory. The relevant UL standards governing UPS systems are UL 1778 and UL 1950. Similarly, other countries, such as Australia and the far East, which are not members of the CENELEC have promulgated their own national standards.

While there may be some similarities among some countries as to some requirements, regulation throughout the world lacks uniformity. Lack of uniformity led to the formation of the CENELEC, but the European Standards have only alleviated the problem to a small degree. Among the CENELEC and other nations, the differences among the varying regulations are substantive not merely formalistic. Several differences between the European and American standards are illustrative. In the United States, the National Electric Code (NEC) requires that safety and neutral lines be tied to ground at an entry box or panel before the power supply from the utility enters a building. There is no European Standard which requires such grounding. Another example is the number of conductors required to open when a non-separately derived UPS system operates in backup mode. The United States requires only the singular opening of the line conductor, while in Europe, two switching relays are required to open both the line and neutral conductors. EN 50091-1-1.

In countries where the neutral and safety lines are not required to be tied to ground at the box or panel, as they are in the United States, a problem has been encountered involving "creeping voltage." UPS systems are generally connected to a load, such as a computer, with EMI capacitors which are used to reduce emissions and radio-frequency interference. These capacitors are connected between the line and neutral conductors, between the line and safety conductors and between the neutral and safety conductors. The voltage at the neutral line should be constantly 0 Volts. When the UPS system operates in backup mode, the capacitors effectively act as a voltage divider between the active, neutral and safety conductors, the capacitance between the active conductor and chassie ground and that between neutral and chassie ground being of approximately equal value. Where the neutral conductor is not connected to frame or UPS safety ground, and thus is left floating, a voltage exists at the neutral conductor with respect to ground. This creeping voltage, experienced by the neutral conductor with respect to ground, is approximately half of the total voltage of the utility which for such total of 230 Volts, as in Europe, is 115 Volts. A voltage of that magnitude may cause damage to sensitive computer equipment.

The problem of creeping voltage does not occur in the United States where the neutral conductor is connected to ground at the panel, effectively maintaining zero voltage with respect to frame ground. For other countries which do not require such a connection, the problem of creeping voltage must be addressed. One solution to the problem is a hard tie between the neutral and safety conductors. Such a tie is required in some countries, such as Australia. However, in other countries, predominantly those in Europe, the active and neutral lines of the line power supply may be switched, which occurs as much as fifty percent of the time. When the active and neutral lines are switched, a hard tie connects the active line, instead of the neutral line, to frame ground which may cause a short-circuit to the utility. Therefore, while a hard tie is a solution for UPS systems in some countries, such as Australia, in Europe a different solution is required.

As the above indicates, maintaining a zero voltage at the neutral line may not be a problem at all in one country, a problem with a simple solution in another and a problem with an as yet undiscovered solution in another. Currently, manufacturers of UPS systems have been forced to develop, supply and provide support for a number of different systems which address this voltage problem but remain in compliance with differing regulatory standards and line setups.

BRIEF SUMMARY OF THE INVENTION

The present invention is addressed to an uninteruptible power supply having universal application throughout the world, particularly in Asian, European and South American countries, regardless of differing national electrical standards and regulations. Customization of a number of UPS systems to meet differing regulations involves considerable expense. A universal design topology makes such country-by-country customization unnecessary, and, in addition, eliminates expenses associated with identification and tracking which are needed to ensure delivery of UPS systems with proper specifications to each country. Further, excess demand in one country may be met with excess supply from another with no modification of the UPS required, saving both time and money. A common UPS design, thus, provides decreased costs in production and warehousing and increased convenience in meeting demand.

A pair of backfeed relays, which are mandated by countries outside the United States, are controlled by an overall control circuit to perform in conjunction with the connection of neutral to system ground to avoid damage to the load, UPS and power utility. The control circuit is responsive to an anomaly in the power supply of a power utility to enter a backup mode wherein power is supplied by a battery power supply through an inverter to the load. Entry into backup mode occurs subsequent to a series of delay intervals which govern the control circuit's operation of the backfeed relays and formation of the neutral to system ground connection.

One aspect of the invention is the inclusion of a unique neutral bonding circuit to form the neutral to system ground connection. The neutral bonding circuit is included within the UPS, but is an optional feature that must be enabled by the user to be operational. The neutral bonding circuit provides system protection by automatically coupling the neutral line to safety ground when the UPS enters backup mode. Coupling of neutral to safety ground is required in some countries, such as Australia, and also eliminates voltage buildup, i.e. "creeping voltage." The automatic coupling is provided by the neutral bonding circuit in the form of a neutral bonding relay which is maintained in a normally open configuration. When the overall control circuit senses an anomaly in utility power, the neutral bonding relay is closed under a protective timing feature providing electrical coupling of neutral to system ground. This electrical coupling maintains the neutral line at substantially zero volts while the UPS operates in backup mode. When the anomaly terminates, the neutral bonding relay is opened and maintained in an open configuration until the UPS again enters backup mode. Thus, coupling of neutral to system ground is automatically provided and removed when the UPS enters backup mode and returns to standby mode. In countries where this coupling is not required or desired, the neutral bonding circuit is simply not enabled by the user.

The neutral bonding circuit also is designed to accommodate differing power utility inputs which occur from country to country, including the reversal of line and neutral. A protective timing feature prevents the automatic coupling of neutral to system ground by the control circuit until the UPS is disconnected from the power supply of the power utility. A series of delay intervals, created by logic or a microprocessor, ensure that the backfeed protection relays open before the neutral bonding relay closes when the UPS transitions to backup mode. Similarly, the series of delay intervals also ensure that the backfeed protection relays close after the neutral bonding relay opens when the UPS returns to standby mode. Thus, the delay intervals time the opening and closing of the relays such that an unanticipated coupling of any of the inputs to system ground will not occur.

Another aspect of the invention provides for the inclusion of an enabling assembly incorporating a user actuable screw. The presence of the screw on the rear face of the UPS alerts the user that some action must be taken regarding the operation of the UPS. Engagement of the screw enables the neutral bonding circuit. The screw is accessible through an opening on the front face of the UPS device and can be engaged with a screwdriver. The position of the screw within the opening allows the user to determine at a glance whether the neutral bonding circuit is enabled.

Other objects of the invention will, in part, be obvious and will, in part, appear hereinafter. The invention, accordingly, comprises the apparatus possessing the construction, combination of elements, and arrangement of parts which are exemplified in the following description.

For a fuller understanding of the nature and objects of the invention, reference should be had to the following detailed description taken in connection with the accompanying drawings.

BRIEF DESCRIPTION OF THE DRAWINGS

FIG. 8 is a sectional view taken through plane 8—8 in FIG. 1.

FIG. 9 is another view of FIG. 8 with certain components removed.

FIG. 11 is a status table illustrating the operation of the circuitry of FIG. 11.

DETAILED DESCRIPTION OF THE INVENTION

Figure 1:
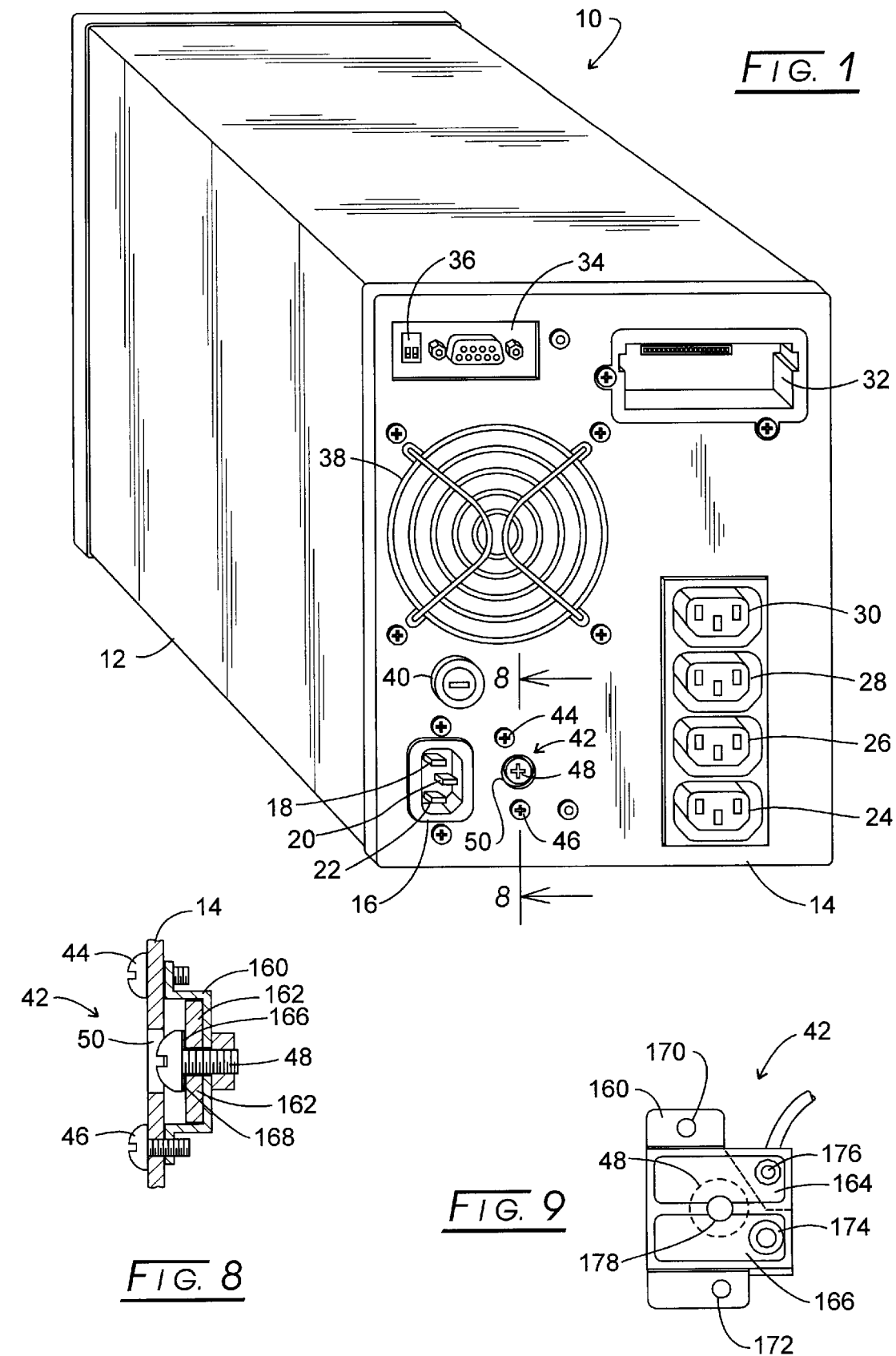
FIG. 1 is a pictorial representation of a typical UPS system including the apparatus of the invention.

Referring to FIG. 1, a typical UPS device configured for sale outside the United States, particularly in Asian, European and South American markets, employing the features of the invention is represented generally at 10. UPS 10 includes a housing 12, the rearward face of which is shown at 14. Rearward face 14 includes an input receptacle 16 which connects the UPS 10 to the power supply of a power utility. Conductors 18, 20 and 22 at input receptacle 16 connect the line, neutral and safety ground conductors of the UPS 10 to the corresponding three lines of the power utility. Rearward face 14 also includes output receptacles 24–30. Output receptacles 24–30 connect the UPS system to the loads for which power from the utility is to be supplied. UPS 10 is designed for relatively smaller loads, for example, up to 3 KVA. Because the device 10 is intended for use outside the United States, output receptacles 24–30 are provided as European style plugs. A communication interface 32 is incorporated within device 10 to allow the user to connect option cards for additional communication options. A communication port also is present at 34 allowing connection of the UPS 10 to a computer. An output voltage selector switch 36 is provided adjacent port 34. Using output voltage selector 36, the user can select different output voltages. A cooling fan (not shown) is included within housing 12 to prevent the overheating of components contained therein. The exhaust grid of the cooling fan is shown at 38. An input fuse is provided at 40 for internal protection.

An enabling assembly forming a component of a neutral bonding circuit of the invention is shown generally at 42. Contained within housing 12, enabling assembly 42 is attached to the interior surface of rearward face 14 by screws 44 and 46. Enabling assembly 42 includes an electrically conductive circuit completing threaded component shown at 48. The component 48, for example, may be implemented as an electrically conductive machine screw. Screw 48 is installed through and may be accessed by the user through aperture 50 and is manually actuable by a screwdriver to complete the noted neutral bonding circuit (not shown).

Under the United States Electrical Code, neutral and safety ground lines are tied to ground at the entry box or panel of a building facility before the power supply from a power utility is permitted to enter. This permanent connection maintains the neutral line at substantially zero voltage. Outside the United States, other countries' national electrical regulations and standards typically do not require such a connection. Where this connection is not made, when a UPS device operates in backup (battery powered) mode, voltage at the neutral conductor within the UPS apparatus is left floating. If the neutral conductor so floats, the system may experience backup voltage, i.e. "creeping voltage," from the neutral conductor to frame ground. This backup voltage may damage the UPS device or load.

Figure 2:
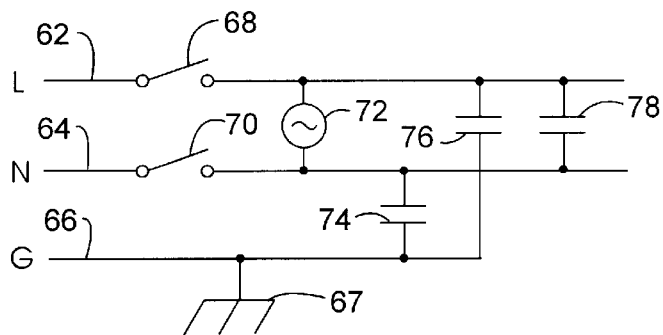
FIG. 2 is a stylized drawing of certain components of a UPS system of the prior art showing potential inter-line capacitance.

FIG. 2 represents components of interest of a typical UPS circuit of the prior art where there is no connection of the neutral conductor with system ground. The UPS components of FIG. 2 include two backfeed protection relays connected into the line and neutral conductors, two such switching devices typically being mandated by countries outside the United States. These backfeed protection relays are represented respectively as switches at 68 and 70. In the United States, only one relay, controlling line input, is required to disconnect the power supply from the power utility. The three lines of a power utility are connected to corresponding line, neutral and safety ground conductors of the UPS device which are shown at 62, 64 and 66 respectively. Safety ground conductor 66 is coupled to chassis or frame ground at 67. When operating in standby mode, i.e. under utility power, backfeed protection relay switches 68 and 70 are actively retained in a closed circuit configuration so as to supply utility power to a load. However, upon entry into a backup mode, switches 68 and 70 are opened, as shown, to disconnect line conductor 62 and neutral conductor 64 from the corresponding utility lines. Power then is supplied by a battery power supply (not shown) through an inverter to the load. The inverter is shown as a symbol 72. EMI filter capacitors as depicted at 74, 76 and 78 are conventionally included within typical UPS systems, as well as electronic loads, and are associated with the line, neutral and safety (frame) ground conductors 62, 64 and 66 as symbolically represented. In this regard, a capacitance represented by capacitor symbol 74 is connected between neutral conductor 64 and safety or frame ground conductor 66. Similarly, a capacitance represented by capacitor symbol 76 is connected between line conductor 62 and safety or frame ground conductor 66, while a capacitance represented by capacitor symbol 78 will be present between line conductor 62 and neutral conductor 64. Capacitances represented by capacitor symbols 74 and 78 usually are balanced or of approximately equal value. In conventional fashion, EMI capacitor functions 74, 76 and 78 act as filters to reduce emission and radio-frequency interference.

Safety ground conductor 66 is associated with the safety ground line of the power utility. Conductor 66, in effect, extends through the UPS to the output of the system.

Figure 3:
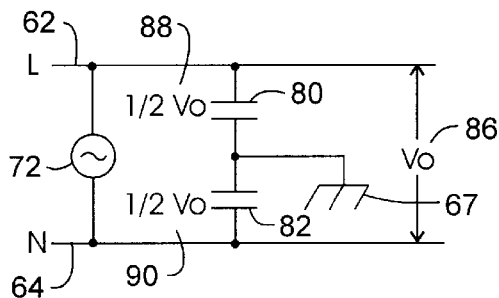
FIG. 3 is an equivalent circuit of FIG. 2.

EMI capacitors as represented by symbols 74, 76 and 78 effectively create the equivalent circuit shown in FIG. 3. Looking to that figure, inverter 72 is shown connected between line conductor 62 and neutral conductor 64. This equivalent circuit demonstrates that capacitances, represented by capacitor symbols as at 80 and 82, are present between line conductor 62 and chassis ground 67, as well as between neutral conductor 64 and such ground. Additionally, they are of approximately equal value of capacitance. Ideally, neutral conductor 64 should be maintained at 0 volts with respect to chassis ground, but equivalent capacitances 80 and 82 will react somewhat as an a.c. voltage divider which creates a voltage along neutral conductor 64 with respect to chassis ground. For example, in backup mode the a.c. power supply provided by inverter 72 creates a voltage, $V_O$, between line conductor 62 and neutral conductor 64 as at 86. Because of the presence of equivalent capacitors 80 and 82, half of $V_O$ at 88 is produced between line conductor 62 and chassis ground 67. Half of voltage $V_O$ at 90 (½ $V_O$) also is seen between neutral conductor 64 and chassis ground. In such a UPS system where the output voltage is, for example, 230 volts, the neutral to ground voltage will be approximately 115 volts. A presence of such voltage may cause damage to the UPS or any load connected to the UPS.

Figure 4:
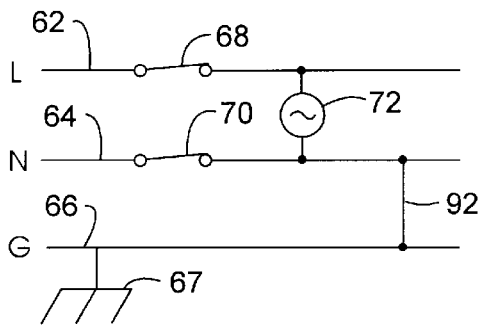
FIG. 4 is a stylized drawing of a UPS system of the prior art with bonded neutral to ground.
Figure 5:
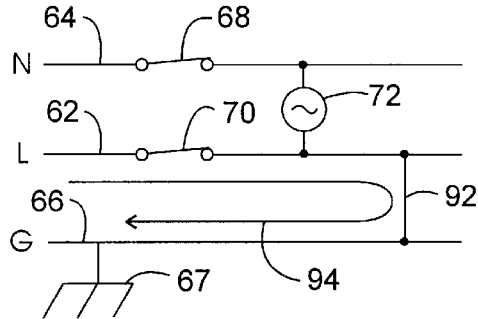
FIG. 5 is a stylized drawing of the UPS system of FIG. 4 with reversed line and neutral inputs.

FIG. 4 represents certain components of a UPS circuit of the prior art with neutral conductor 64 permanently connected to safety ground conductor 66 as represented at line 92. Such a connection prevents the build-up voltage problem described above and is required in some countries, such as Australia. This type of permanent tie is problematic in European, and perhaps other countries, where, as often as 50% of the time, line and neutral from the power utility are switched. FIG. 5 represents the circuit of the UPS device of FIG. 4 whose internal conductors are connected to the power supply of a power utility in a manner where line and neutral inputs are inadvertently switched. The neutral conductor remains identified at 64, the line conductor at 62, with the safety ground conductor remaining at 66. With line and neutral utility inputs switched, permanent tie 92 now connects line conductor 62 with safety ground conductor 66. A tie between these two conductors creates a current loop 94 which can cause a short circuit and damage.

Figure 6:
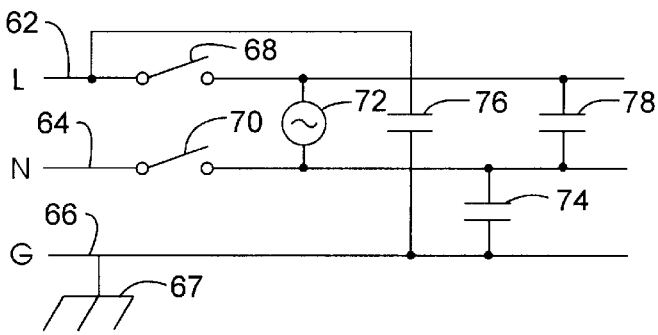
FIG. 6 is a stylized drawing of certain components a UPS system of the prior art showing specified inter-line capacitances.

FIG. 6 represents one approach taken to deal with the problem of voltage development at frame ground-to-neutral where a permanent tie, as described at 92 in connection with FIGS. 4 and 5, is sought to be avoided. The circuit is configured, as in FIG. 2, with line conductor 62, neutral conductor 64 and safety ground conductor 66. Backfeed protection relay switches 68 and 70, inverter 72, and capacitor symbols 74, 76 and 78 reappear as configured in FIG. 2. In this approach, an added Capacitor 76 is provided. At first observance, the circuit of FIG. 3 would be modified by the arrangement of FIG. 6. In this regard, because capacitor 76 is disconnected from the output during backup mode, instead of acting as an a.c. voltage divider, splitting voltage between neutral conductor 64 and line conductor 62, the large capacitance of capacitor 76 is intended to reduce the voltage between neutral conductor 64 and chassis or frame ground 67 so as to approach 0 volts. This approach, while effective for resistive loads, is not effective for electronic loads, i.e. computers, which have self-incorporated EMI filter capacitors. In this regard, those electronic load carried capacitors bring the capacitive balance described in FIG. 3 back into the system to create the unwanted neutral to ground voltage buildup.

Figure 7:
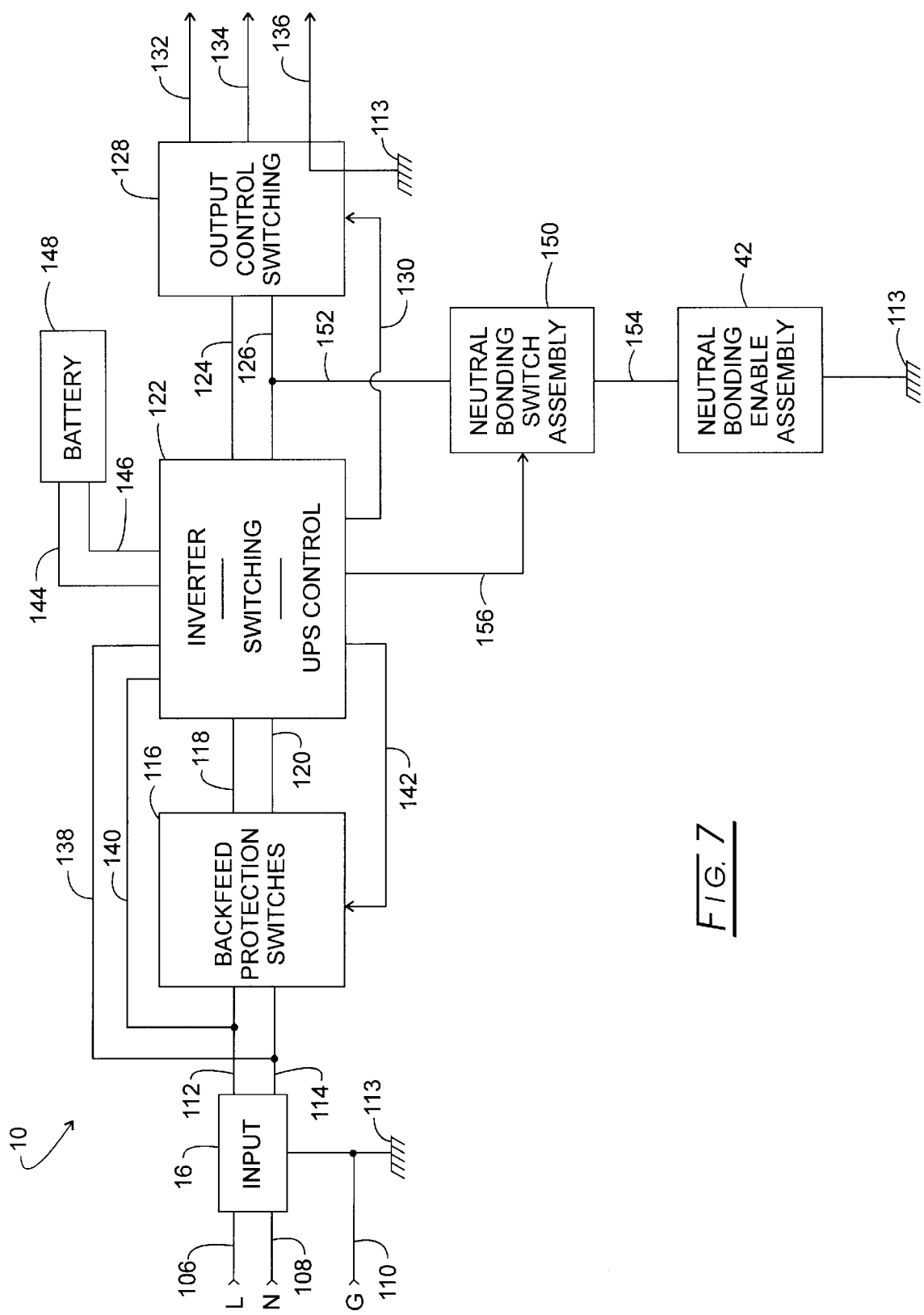
FIG. 7 is a block diagrammatic representation of certain circuits employed with a typical UPS including the circuitry of the invention.

Referring to FIG. 7, a block diagrammatic representation of certain circuitry employed with a typical UPS device, including the neutral bonding and enablement features of the invention, is provided. Certain numeration from FIGS. 1 and 2 is retained in FIG. 7. Line and neutral from the power utility are shown at lines 106 and 108 entering the UPS device 10 at the input represented at block 16. Line and neutral are now conductors within the UPS device 10 and are represented respectively at lines 112 and 114. These then reflect the attributes of the incoming utility lines. Line 110 connects at input 16 to become frame or chassis ground 113. From input 16, conductors 112 and 114 extend to backfeed protection switches represented at block 116. Block 116 represents a pair of backfeed protection relay switches which are controlled as represented by line 142 from an Inverter/Switching/UPS Control represented, inter alia, at block 122. UPS Control 122 responds to anomalies in the power supply of the power utility to enter a backup mode wherein power is supplied to the load from a battery power supply. Anomalies may result from out of specification voltages, such as "sags" or "surges," power loss or from various noise phenomena. When an anomaly is not sensed, the UPS control 122 operates the UPS in standby mode. UPS Control 122 actively maintains backfeed protection switches 116 in a closed configuration, and utility power is transmitted via lines 118 and 120, thence via lines 124 and 126 to an Output Control Switching function as represented at block 128. UPS Control 122 controls the Output Control Switching 128 via line 130. Output Control Switching function 128 is present as a conventional UPS switching function which allows power to be supplied to output lines 132, 134 and 136 which are connected, in turn, to the corresponding line, neutral and safety ground connectors of a load (not shown). Load line 136 connects to chassis or frame ground 113.

As noted above, UPS Control 122 monitors the power supply from the power utility via sensing lines 138 and 140. When an anomaly is sensed, the Control function 122 derives a control input condition as well as a neutral bonding input and enters a backup mode. The control input condition is presented via line 142 to render the backfeed protection switches of function 116 in an open circuit condition. Utility power is no longer supplied to the load. Instead, power is supplied, in conventional fashion, via lines 144 and 146 from the battery power supply represented at block 148. This battery-originated power supply passes to and is treated by the inverter of UPS Control 122 to output switching 128 via lines 124 and 126. Output Control Switching continues to function, under the control of UPS Control 122 to connect the power supply to the output lines 132, 134 and 136 which connect to or represent the load.

A Neutral Bonding Switch Assembly represented at block 150 is connected to neutral conductor line 126 via line 152. Switch assembly 150 may be enabled by the user by virtue of a Neutral Bonding Enable Assembly now represented by block 42 via line 154. (see additionally FIG. 1) When enablement is carried out by the user at function 42, the UPS Control 122 will be capable of deriving a neutral bonding input condition by transmission of a signal via line 156 to switch assembly 150. This occurs when the control function 122 senses an anomaly in the power supply of the power utility via sensing lines 138 and 140. When the input condition is asserted via line 156, switch assembly 150 provides electrical coupling of line 126 to chassis or system ground 113 through Neutral Bonding Enable Assembly 42. A protective timing feature ensures that such electrical coupling of line 126 to frame ground will not be provided until UPS 10 is disconnected from the power utility at switch function 116.

When the anomaly terminates, the UPS control 122 senses such return to normalcy and removes the neutral bonding input condition by removal of the signal or input condition at line 156 to open the switch of switch assembly 150 and thus disconnect line 126 from chassis or frame ground 113. UPS Control 122 also removes the control input condition at line 142 to cause closure of the backfeed protection switches at 116. As part of this procedure, Switching Control at function 122 then transitions the UPS 10 from backup mode to standby mode, effectively isolating the battery power supply from the inverter function. Power from the utility then is supplied to the output lines 132, 134 and 136 in standby mode, as described above. Typically, the batteries are re-charged during the ensuing standby mode. The protective timing feature, described above, also ensures that the neutral bonding electrical coupling will be terminated before power is supplied from the power utility to return to a standby mode.

Looking to FIG. 8, interior components of enabling assembly 42 are shown. Numeration from FIG. 1 is retained where appropriate in FIG. 8. A bracket 160 is attached to rearward side of face 14 with machine screws 44 and 46. Connected to the interior of bracket 160 is a printed circuit board 162 upon which two conductive printed circuit pads at surfaces 164 and 166 are formed. Also connected through bracket 160 is the earlier described enabling screw 48 which is manually insertable through aperture 50 to effect mutual physical electrical engagement and create circuit completion between printed circuit pads 164 and 166. Electrical engagement of circuit pads 164 and 166 enables a neutral bonding circuit, as at 150 (FIG. 7), which provides electrical coupling of the neutral conductor to ground when the UPS 10 operates in backup mode. At the outset of use of UPS device 10, the presence of such an aperture 50 and the presence of a screw 48 serves to alert the user that a decision must be made regarding the invocation of a neutral bonding option. By simply inserting the screw 48, the neutral bonding circuit may be enabled by the user with a screwdriver without disassembly procedure.

FIG. 9 shows a side view of the assembly 42 of FIG. 8 with components removed to show internal features. Bracket 160 is shown with openings 170 and 172 into which machine screws 44 and 46 are engaged to attach bracket 160 to the rearward surface of rearward face 14 of UPS 10. Bracket 160 supports printed circuit 162 which is attached thereto by bolt and nut assembly 174. The bolt assembly 174 also provides electrical connection of printed circuit pad 164 to frame ground. Conductive pad 166 of printed circuit board 162 is coupled to a lead 176 which provides connection with the neutral line of the power utility. Screw 48 is manually threadably engaged within threaded opening 178 in bracket 160. The screw 48 provides circuit completing electrical engagement between printed circuit pads 164 and 166 as shown by the phantom representation of its head component.

Figure 10:
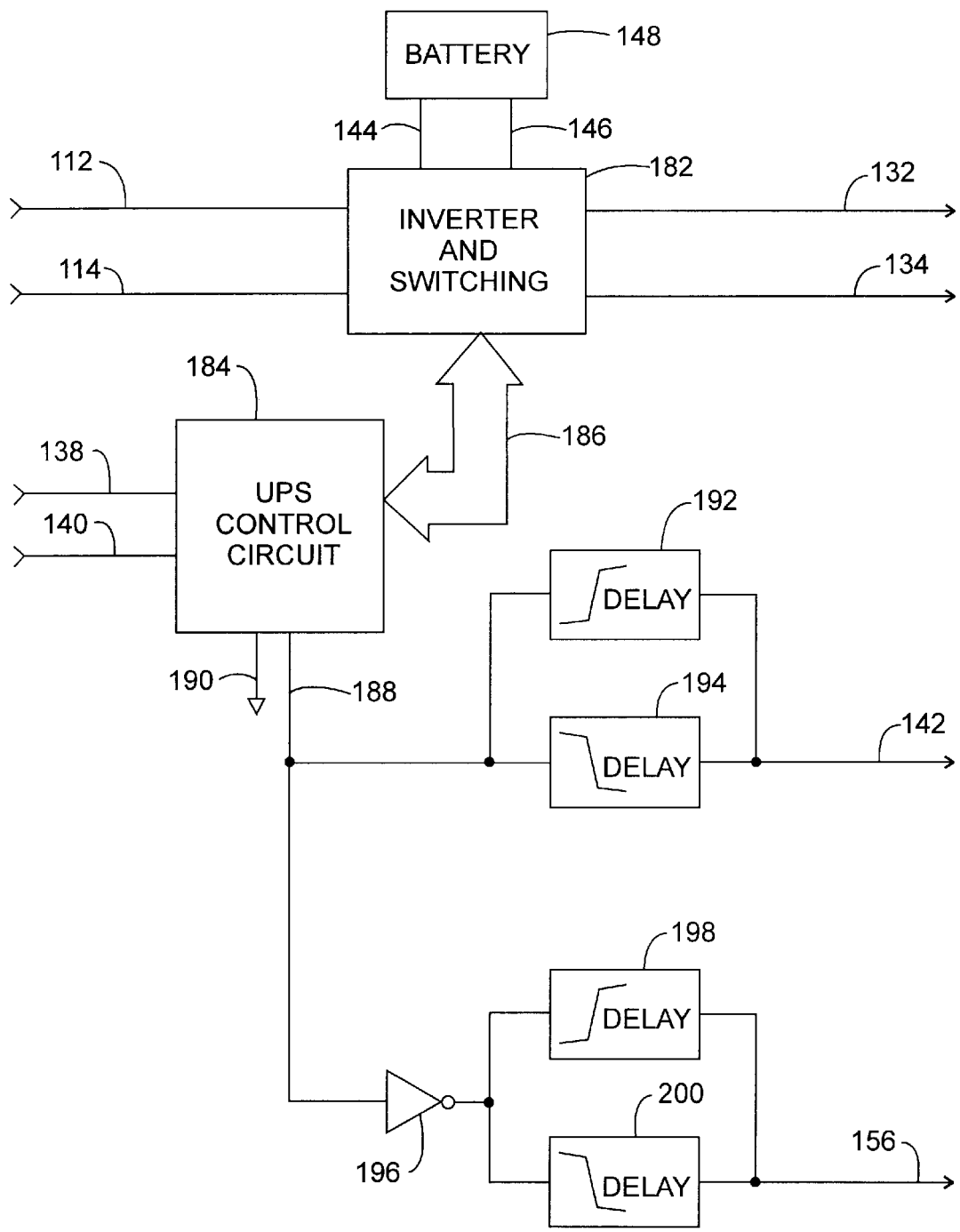
FIG. 10 is a block diagrammatic representation of components of the invention showing a delay feature.

FIG. 10 is a block diagrammatic representation of the circuitry employed with the invention which shows in greater detail the operation of the UPS Control Circuit of FIG. 7. FIG. 10 also demonstrates the protective timing features associated with the backfeed protection and neutral bonding switches. The numeration of FIG. 7 is retained where appropriate in FIG. 10. Internal line and neutral conductors 112 and 114 extend to the Inverter and Switching function of the UPS system represented at block 182. Battery power supply 148 is connected by lines 144 and 146 to the Inverter and Switching function at block 182. Output lines 132 and 134, which are, in effect, a continuum of line and neutral conductors 112 and 114, extend from Inverter and Switching function at block 182 to supply either utility or battery backed-up power to a load. Communication between the UPS Control Circuit represented at block 184 and the Inverter and Switching function at block 182 is shown via dual-directional arrow 186. Control Circuit 184 communicates with the remaining UPS functional blocks of FIG. 7 as represented at line 190. When UPS Control Circuit 184 maintains UPS device 10 in standby mode, it presents a logic high signal at line 188. In backup mode, a low logic signal occurs at line 188. The signal condition at line 188, inter alia, controls the backfeed protection switches 116 from line 142. (FIG. 7) Because of the presence of inverting circuit component 196, the same signal condition at line 188 may also control neutral bonding switch assembly 42 from line 156.

A series of delay functions, shown at 192, 194, 198 and 200, provide system protection when Control Circuit 184 transitions UPS device 10 from standby mode to backup mode and from backup mode to standby mode. Looking additionally to FIG. 11, a status table illustrates the dual states of UPS device 10, the corresponding conditions of the backfeed circuit and the neutral bonding circuit when in such states, and the corresponding delays associated with the circuits in the course of operational mode changes. As seen in FIG. 11, the delay networks are only associated with the mode transitions of UPS device 10 as opposed to its steady states. Returning to FIG. 10, in the absence of an anomaly in the power supply of the power utility, UPS device 10 operates in standby mode, where the backfeed relay switch control circuit is activated with backfeed protection switches 116 actively retained in a closed circuit configuration. Conversely, during this mode the neutral bonding circuit is "off" with the Neutral Bonding Switch Assembly 150 being passively retained in a normally open circuit configuration. When it senses an anomaly in utility power at lines 138 and 140, Control Circuit 184 transitions UPS device 10 from standby mode to backup mode. The signal condition at line 188 correspondingly transitions from a logic high state to logic low state and certain delay categorized intervals are carried out as represented at blocks 194 and 198. Block 194 corresponds to Delay 2 in FIG. 11, while block 198 corresponds to Delay 3. Delay 2 (block 194) ensures that the backfeed circuit turns off fast in response to the mode switching signal condition at line 188, quickly opening backfeed protection switches 116 (FIG. 7). Delay 2 essentially approaches 0 ms.. Delay 3 (block 198) ensures that the neutral bonding circuit turns on following a delay, in response to the signal condition at line 188. The neutral bonding switch of Assembly 150 closes, for example, after a 10 ms. delay. This delay ensures that the backfeed protection switches will be opened before the neutral bonding switch is closed to thus avoid the short circuiting phenomena due to inadvertent line/neutral reversal as discussed above.

With a logic low signal at line 188, the backfeed protection switches are in their normally off condition and the neutral bonding switch is actively retained in a closed orientation, UPS device 10 then operating in its backup mode. When Control Circuit 184 senses a utility return to normalcy at lines 138 and 140, it transitions UPS device 10 from backup mode to standby mode. To carry this out, Control Circuit 184 transitions the signal condition at line 188 from a logic low state to a logic high state, and delay networks 192 and 200 are employed. Block 192 corresponds to Delay 1 and block 200 corresponds to Delay 4 as shown in FIG. 11. Delay 4 is relatively short, ensuring that the neutral bonding circuit turns off quickly in response to a change in the signal condition at line 188. Delay 4 may effectively approach 0 ms.. Delay 1 (block 192) ensures that that the backfeed relay control circuit will close switches 116 following a delay in response to a change in the signal condition at line 188. Delay 1 may be, for example, 10 ms.. These delays as represented at blocks 192 and 200 ensure that the neutral bonding switch of Assembly 150 will open before backfeed protection switches 116 close. The UPS device 10 then operates in standby mode as described above. Such switch timing again assures that no short circuiting as described above will occur.

The delay functions 192, 194, 198 and 200 prevent electrical coupling by neutral bonding assembly 150 when the UPS device 10 is receiving the line inputs of the power utility. Inclusion of this protective timing feature allows the UPS device 10 to universally accommodate differing power utility inputs, especially where the line and neutral are reversed. With the opening and closing of these switches under careful control, there can be no damaging connection of a power utility line input to system ground.

Figure 12:
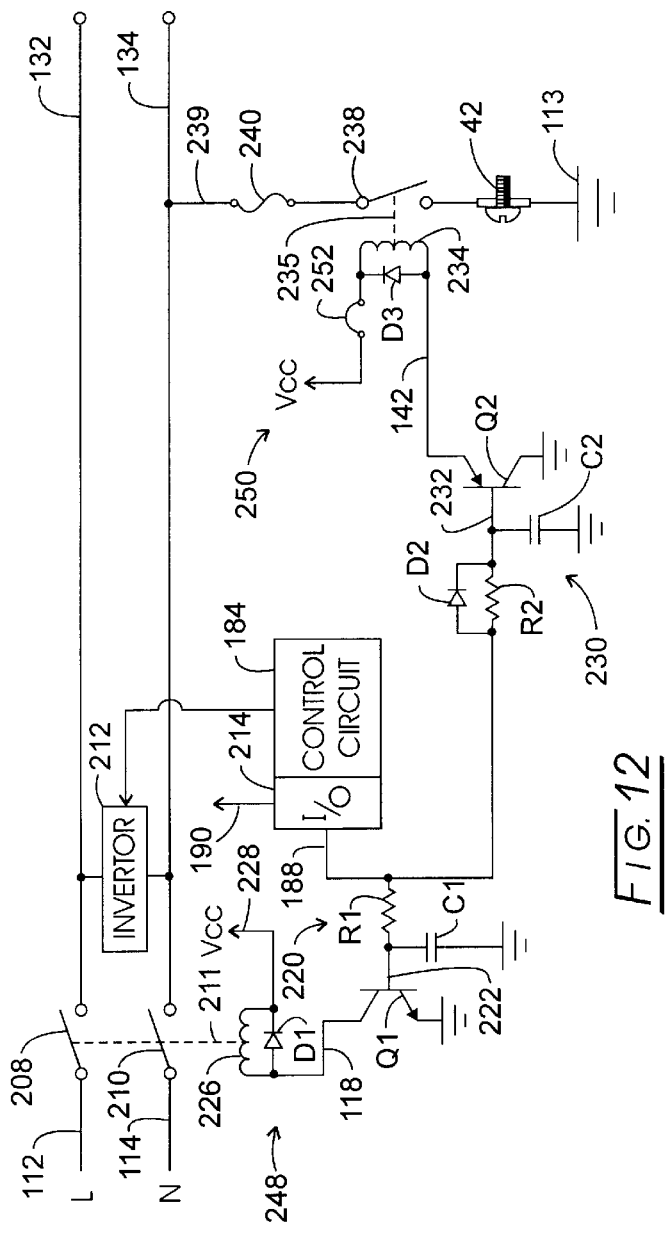
FIG. 12 is an electrical schematic portrayal of one implementation of the invention.

Referring to FIG. 12, an electrical schematic portrayal of one implementation of the invention is provided with discrete electronic components for illustrative purposes. Certain numeration from FIG. 10 is retained. Line and neutral input conductors 112 and 114 are shown leading to paired electromagnetically actuated backfeed relay switches 208 and 210. The inverter, which is represented at block 212, is controlled by Control Circuit 184, which is shown incorporating an input/output port 214. Control Circuit 184 senses anomalies and the termination of anomalies in utility power as above described in connection with FIG. 7. The backfeed and neutral bonding control circuits described in connection with FIGS. 10 and 11 are represented generally at 248 and 250 respectively. Control Circuit 184 controls these circuits by asserting a select signal condition at line 188. Whether in standby mode or backup mode, power is supplied to a load from output at lines 132 and 134.

Backfeed circuit 248 includes an RC network shown generally at 220 incorporating resistor R1, capacitor C1 and diode D4 formed with line 222. Network 220 will exhibit a time constant of, for example 10 ms.. Line 222 is seen directed to the base of an npn transistor Q1 which is coupled to ground at its emitter. The collector of transistor Q1 is coupled at line 118 to an inductor 226 which, when energized, will close backfeed relay switches 208 and 210 as represented by dashed line 211. Included to accommodate inductive spikes is protective diode D1. Note that inductor 226 is coupled to positive $V_{cc}$. When operating in standby mode, application of a logic high signal will forward-bias transistor Q1 to draw current through inductor 226 to, in turn, retain backfeed protection switches 208 and 210 in closed circuit configuration. During standby mode, the high logic signal condition at line 188 also extends to neutral bonding circuit 250. Neutral bonding circuit 250 includes an RC network represented generally at 230 which incorporates resistor R2, capacitor C2 and diode D2 within line 188. Network 230 will exhibit the same time constant as network 220, being, for example, 10 ms.. Line 188 extends to the base of pnp transistor Q2 whose collector is coupled to ground. The emitter of transistor Q2 extends at line 142 to an inductor 234 which, when energized, will close neutral bonding switch 238 as represented by a dashed line 235. Switch 238 is coupled within a line 239 which, in effect, is coupled between neutral conductor 132 and frame ground 113. A protective diode D3 is coupled across inductor 234 to accommodate inductive spikes. Note that inductor 234 is coupled to positive $V_{cc}$. Neutral Bonding Circuit 250 may be enabled by an enabling assembly, such as that shown at 42 and as described in FIGS. 8 and 9, or by a jumper as shown at 252. Jumper 252 may also be a programmable electromagnetically actuated relay switch. A variety of enabling assemblies will occur to those skilled in the art. A protective fuse also is included at 240 within line 239. Application of a logic high signal to transistor Q2 retains it in an off state, no current being drawn through inductor 234 at line 142, and neutral bonding switch 238 is retained in its normally open configuration. In this regard, a high logic condition at line 188 rapidly charges capacitor C2 of network 230 through bypass diode D2. The resultant charge on capacitor C2 retains transistor Q2 in an off-state. Thus, while operating in standby mode, continuous application of a logic high signal at 188 retains the backfeed protection switches 208 and 210 in a closed circuit configuration and neutral bonding switch 238 in an open circuit configuration.

When UPS device 10 senses an anomaly in the power supply of the power utility at line 190, Control Circuit 184 transitions UPS device 10 from standby mode to backup mode. The signal condition at line 188 correspondingly transitions from logic high to logic low. The delay intervals discussed in connection with FIGS. 10 and 11 are provided by networks 220 and 230. Because of the presence of diode, D4, application of a logic low signal at line 188 will forthwith turn off transistor Q1 such that no current will flow through inductor 226, opening backfeed protection switches 208 and 210. This activity corresponds to block 194 of FIG. 10. When the signal condition transitions from a high state to a low state, Network 230 provides the longer delay discussed in connection with block 200 of FIG. 10. Diode D2, being reversed biased, capacitor C2 will discharge over a delay interval through resistor R2 to turn on transistor Q2. This delay interval will be, for example, 10 ms.. Transistor Q2 will then draw current through inductor 234 to close neutral bonding switch 238. Neutral bonding switch 238 provides electrical coupling between neutral conductor 114 and system ground 113. With neutral bonding switch 238 retained in a closed circuit configuration and backfeed protection switches 208 and 210 retained in an open circuit configuration, the UPS device 10 operates in backup mode.

When Control Circuit 184 senses the absence of an anomaly, or the return of utility power to normalcy, a logic high signal will be present at line 188. Networks 220 and 230 now provide the delays associated with blocks 192 and 198 respectively as described in FIGS. 10 and 11. Upon transition from a logic low signal to a logic high signal at line 188, transistor Q2 will be turned off forthwith due to the forward biasing of diode D2. As transistor Q2 turns off, no current will be drawn through inductor 234 and neutral bonding switch 238 revert to its normally open configuration. Network 220 will interpose a delay, corresponding to its time constant of, for example, 10 ms.. Application of a logic high signal to the base of transistor Q1 will again draw current through inductor 226 to close backfeed protection switches 208 and 210. With the neutral bonding switch remaining in an open circuit configuration and the backfeed protection switches retained in a closed circuit configuration, UPS device 10 operates once again in standby mode.

Figure 13:
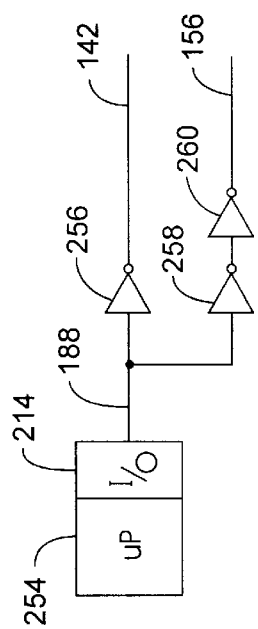
FIG. 13 is a stylized representation of a microprocessor-based implementation of the invention.

Referring to FIG. 13, another implementation of the invention is shown. The numeration of FIG. 12 is retained. Control Circuit 184 may consist of a microprocessor, shown at 254, which provides the delays as described in FIGS. 10 and 11. The presence of three inverting circuit components, represented at 256, 258 and 260, instead of one may be necessary to create a buffer where microprocessor 254 alone is unable to actuate backfeed protection switches 208 and 210 and neutral bonding switch 238.

Since certain changes may be made in the above-described apparatus without departing from the scope of the invention herein involved, it is intended that all matter contained in the description thereof or shown in the accompanying drawings shall be interpreted as illustrative and not in a limiting sense.

What is claimed is:

1. An uninterruptible power supply, comprising:
   an input with line, neutral and safety ground conductors connectable with a corresponding three line power supply of a power utility;
   an output with line, neutral and safety ground conductors connectable with a load;
   a first switch coupled in switching relationship with said line conductor at said input;
   a second switch coupled in switching relationship with said neutral conductor at said input;

said first and second switches being responsive to a control input condition to open circuit said line conductor and said neutral conductor at said input;

an inverter connected to said line conductor intermediate said first switch and said output and connected to said neutral conductor intermediate said second switch and said output;

a battery power supply electrically connected to said invertor;

a third switch coupled in switching relationship between said neutral conductor and said safety ground of said uninterruptible power supply and actuable into a closed circuit condition in response to a neutral bonding input condition; and a control circuit in electrical communication with said inverter having a standby mode providing for the delivery of power from said power supply of said power utility through said first and second switches to said load, and responsive to an anomaly in said power supply of said power utility to derive said control input condition and said neutral bonding input condition and enter into a backup mode to deliver battery derived power from said inverter to said load.

2. The uninterruptible power supply of claim 1 in which said neutral bonding input condition is derived by said control circuit subsequent to the said derivation of said control input condition.

3. The uninterruptible power supply of claim 1 in which said neutral bonding input condition is derived as a delayed said control input condition.

4. The uninterruptible power supply of claim 1 in which said third switch is located within said uninterruptible power supply intermediate said first switch and said output and intermediate said second switch and said output.

5. The uninterruptible power supply of claim 1 in which said control circuit is responsive to entry into said back-up mode to derive said control input condition subsequent to a first delay interval and is responsive to derive said neutral bonding input condition subsequent to a second delay interval greater than said first delay interval.

6. The uninterruptible power supply of claim 1 in which:
said third switch is a component of a neutral bonding circuit extending between said neutral conductor and said safety ground of said uninterruptible power supply; and
said neutral bonding circuit includes an enabling assembly manually actuable to enable an electrical coupling between said neutral conductor and said safety ground of said uninterruptible power supply in the presence of said neutral bonding input condition.

7. The uninterruptible power supply of claim 6 in which said enabling assembly comprises:
first and second circuit completing component spaced apart in a normally open circuit configuration normally disabling said neutral bonding circuit; and
an electrically conductive circuit completing threaded component manually actuable to effect mutual electrical engagement between said first and second circuit completing components.

8. The uninterruptible power supply of claim 6 in which said neutral bonding circuit includes a fuse coupled in series electrical relationship with said third switch.

9. The uninterruptible power supply of claim 1 in which:
said third switch is normally open and electromagnetically actuable into said closed circuit condition in response to the application of current provided as said neutral bonding input condition at an actuating electrical input thereof when said electrical input is enabled;
said third switch is a component of a neutral bonding circuit extending between said neutral conductor and said safety ground of said uninterruptible power supply; and
said neutral bonding circuit includes an enabling assembly manually actuable to enable said electrical input of said third switch.

10. The uninterruptible power supply of claim 1 in which:
said first and second switches are responsive to the removal of said control input condition to close circuit said line conductor and said neutral conductor at said input;
said third switch is actuable into an open circuit condition in response to the removal of said neutral bonding input condition; and
said control circuit is responsive when in said back-up mode to termination of said anomaly in said power supply of said power utility to remove said control input condition and said neutral bonding input condition and enter said stand-by mode.

11. The uninterruptible power supply of claim 10 in which removal of said control input condition by said control circuit is subsequent to the removal of said neutral bonding input condition.

12. The uninterruptible power supply of claim 10 in which said control circuit is responsive to entry into said standby mode to remove said neutral bonding input condition and is responsive to remove said control input condition upon termination of a delay interval.

13. An uninterruptible power supply, comprising:
a housing having a user accessible panel portion;
an input supported by said housing with line, neutral and safety ground conductors connectable with a corresponding three line power supply of a power utility;
an output supported by said housing with line, neutral and safety ground conductors connectable with a load;
a first backfeed protection relay switch coupled in switching relationship with said line conductor at said input;
a second backfeed protection relay switch coupled in switching relationship with said neutral conductor at said input;
said first and second backfeed protection relay switches being responsive to a control input condition to open circuit said line conductor and said neutral conductor at said input;
an inverter within said housing connected to said line conductor intermediate said first switch and said output and connected to said neutral conductor intermediate said second switch and said output;
a battery power supply electrically connected to said invertor;
a control circuit in electrical communication with said inverter having a standby mode providing for the delivery of power from said power supply of said power utility through said first and second switches to said load, and responsive to an anomaly in said power supply of said power utility to derive said control input condition and enter into a back-up mode to deliver battery derived power from said inverter to said load; and
a neutral bonding circuit within said housing extending between said neutral conductor and said safety ground of said uninterruptible power supply for providing an electrically conducting relationship there between when enabled, and including an enabling assembly manually actuable at said user-accessible panel portion to enable said neutral bonding circuit.

14. The uninterruptible power supply of claim 13 in which said enabling assembly comprises:

first and second circuit completing components spaced apart in a normally open circuit configuration normally disabling said neutral bonding circuit; and an electrically conductive circuit completing threaded component manually threadable into circuit completing contact with said first and second circuit completing components.

15. The uninterruptible power supply of claim 14 in which said neutral bonding circuit includes a fuse coupled in series electrical relationship with said enabling assembly.

16. The uninterruptible power supply of claim 13 in which said neutral bonding circuit is located within said housing intermediate said first backfeed protection relay switch and said output and intermediate said second backfeed protection relay switch and said output.

17. The uninterruptible power supply of claim 16 in which:

said neutral bonding circuit includes a neutral bonding relay switch coupled in series circuit relationship with said enabling assembly and actuable into a closed circuit condition in response to a neutral bonding input condition; and said control circuit is responsive to derive said neutral bonding input condition in correspondence with the derivation of said control input condition.

18. The uninterruptible power supply of claim 17 in which:

said neutral bonding input condition is derived by said control circuit subsequent to the said derivation of said control input condition.

19. The uninterruptible power supply of claim 17 in which:

said neutral bonding input condition is derived as a delayed said control input condition.

20. The uninterruptible power supply of claim 17 in which:

said control circuit is responsive to entry into said back-up mode to derive said control input condition subsequent to a first delay interval and is responsive to derive said neutral bonding input condition subsequent to a second delay interval greater than said first delay interval.

21. The uninterruptible power supply of claim 17 in which:

said first and second backfeed protection relay switches are responsive to removal of a control input condition to close circuit said line conductor and said neutral conductor at said input;

said neutral bonding relay switch is actuable into an open circuit condition in response to removal of said neutral bonding input condition; and said control circuit when in backup mode is responsive to the termination of said anomaly to remove said control input condition and neutral bonding input condition and enter standby mode.

22. The uninterruptible power supply of claim 21 in which removal of said control input condition by said control circuit is subsequent to the removal of said neutral bonding input condition.

23. The uninterruptible power supply of claim 21 in which said control circuit is responsive to entry into said standby mode to remove said neutral bonding input condition and is responsive to remove said control input condition upon termination of a delay interval.

* * * * *